United States Patent
Perkins

(10) Patent No.: US 8,249,463 B2
(45) Date of Patent: Aug. 21, 2012

(54) SKEW COMPENSATION ACROSS POLARIZED OPTICAL CHANNELS

(75) Inventor: Drew D. Perkins, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 740 days.

(21) Appl. No.: 11/952,687

(22) Filed: Dec. 7, 2007

(65) Prior Publication Data

US 2009/0148170 A1    Jun. 11, 2009

(51) Int. Cl.
*H04B 10/00* (2006.01)
(52) U.S. Cl. ........ 398/152; 398/184; 398/202; 398/208; 398/65; 398/158; 398/159; 398/205
(58) Field of Classification Search .................. 398/182, 398/183, 184, 188, 192, 193, 194, 195, 200, 398/208, 209, 152, 65, 43, 81, 158, 159, 398/147, 202, 79, 58, 156, 205, 204, 206, 398/207, 213, 214
See application file for complete search history.

(56) References Cited

U.S. PATENT DOCUMENTS

| | | | |
|---|---|---|---|
| 6,137,810 A | 10/2000 | Bjurel et al. | |
| 6,807,377 B1 * | 10/2004 | Watanabe | 398/154 |
| 6,819,872 B2 * | 11/2004 | Farries et al. | 398/102 |
| 7,684,712 B1 * | 3/2010 | Roberts et al. | 398/208 |
| 7,734,188 B2 * | 6/2010 | Kuwata et al. | 398/154 |
| 7,869,712 B2 * | 1/2011 | Cho et al. | 398/79 |
| 2005/0286904 A1 * | 12/2005 | Calabro et al. | 398/152 |
| 2006/0228116 A1 * | 10/2006 | Bontu et al. | 398/152 |
| 2009/0074407 A1 * | 3/2009 | Hornbuckle et al. | 398/43 |

FOREIGN PATENT DOCUMENTS

WO   2004005972 A2   1/2004

OTHER PUBLICATIONS

Shaalan, M., 'International Search Report,' Aug. 2008, European Patent Office, Rijswijk.
Shaalan, M., 'Written Opinion of the International Searching Authority(PCT Rule 43bis.1),' Aug., 2008, European Patent Office, Munich.
Communication pursuant to Article 94(3) EPC in European Patent Application No. 08 859 908.9-2415, Dated: Apr. 19, 2011.

* cited by examiner

*Primary Examiner* — Hanh Phan
(74) *Attorney, Agent, or Firm* — North Weber & Baugh LLP; Ross M. Carothers; David L. Soltz

(57) ABSTRACT

Embodiments of the present invention provide systems, devices and methods for managing skew within a polarized multi-channel optical transport system. In a DP-QPSK system, skew between polarized channels is compensated within the transport system by adding latency to at least one of the polarized channels. The amount of added latency may depend on various factors including the skew tolerance of the transport system and the amount of skew across the channels without compensation. This latency may be added optically or electrically, and at various locations on a channel signal path within a transport node, such as a terminal transmitter or receiver. Additionally, various embodiments of the invention provide for novel methods of inserting frame alignment bit sequences within the transport frame overhead so that alignment and skew compensation may be more efficiently and accurately performed at the transport receiver.

18 Claims, 14 Drawing Sheets

SKEW COMPENSATION ACROSS POLARIZED OPTICAL CHANNELS

BACKGROUND

A. Technical Field

The present invention relates generally to the management of skew within a polarized multi-channel optical system, and more particularly, to frame alignment and skew compensation across polarized optical channels within an optical transport system.

B. Background of the Invention

The capacity of transport systems is continually increasing to provide larger amounts of available bandwidth to clients. These transport systems are able to communicate large amounts of data using optical networking technologies. In certain systems, wavelength division multiplexed (hereinafter, "WDM") transport systems communicate this data on multiple wavelengths between terminal nodes. These WDM systems offer a network provider scalable bandwidth without having to significantly expand the physical infrastructure of a network to realize this additional bandwidth.

Certain transport systems are designed to receive a client signal, re-format the client signal and transmit this reformatted client signal over a long-haul connection. The client signal is subsequently reconstructed at a receiver in the transport system and delivered to the client network. The transport system may operate in accordance with various standard protocols, such as the Optical Transport Network (hereinafter, "OTN") protocols, or proprietary formats and procedures.

Transport systems are designed to interface with various types of client networks. In so doing, the transport system maps data from a client signal into a transport frame in which the data propagates across a transport connection. This mapping procedure is typically specific to the protocol of the client signal and the format of the transport system so that the client signal may be completely reconstructed at a transport receiver. The transport terminal nodes, both transmitter and receiver nodes, are generally able to operate in different modes depending on the type of client signal that is being processed. For example, a transport terminal node may map a client SONET frame into a transport frame using a first mapping procedure or an Ethernet frame into a transport frame using a second mapping procedure.

The transmission characteristics of the client data across the transport connection may depend on both the protocol and rate of the particular client signal. If a client signal is transmitted at a higher rate than the channel rate of the transport system, then the client data is transmitted across multiple channels in the transport system. This multi-channel transmission of client data preserves the rate of the client signal and allows efficient reconstruction of the client signal at a transport receiver node.

Transport technologies have been and are currently being developed to enable efficient communication of this client data on a transport system. In certain transport systems, the client data is transmitted across the transport system on multiple wavelengths. In certain other transport systems, the client data is transmitted across the transport system on multiple polarized channels, some of which may be on the same optical wavelength. Certain other transport systems may use a combination of wavelengths and polarized channels to communicate the client data across the transport system. Each of these wavelengths and/or polarized channels is received at a transport receiver node and the client signal is reconstructed by rebuilding and serializing the client data.

The transport receiver node requires that the differential latency between the channels, including the polarized channels, fall below a certain threshold in order for proper reconstruction of the client signal to occur. This differential latency or skew describes timing mismatches between the channels at the transport receiver node.

FIG. 1 generally illustrates an exemplary polarized multi-channel transport system. The transport system 100 comprises a first terminal node 110 that receives a high-rate client signal from a first client node or network gateway 120. The first terminal node 110 divides the client signal across multiple polarized optical channels and transmits the optical channels to a second terminal node 130. The second terminal node 130 reconstructs the high-rate client signal from the polarized optical channels and transmits the reconstructed signal to a second client node 140. One skilled in the art will recognize that the polarized multi-channel transport system 100 may be used to transport various types of client signals and signal rates.

An example of such a client signal is a 100 gigabit Ethernet signal that is framed and transmitted across the polarized multi-channel transport system 100. The 100 gigabit Ethernet signal may be transported on two polarized 50 gigabit channels, both of which are on the same optical wavelength or on different optical wavelengths. As previously mentioned, the transportation of these polarized and non-polarized optical channels requires that timing between these channels be maintained within a threshold. If this timing becomes too large (i.e., the signal skew is too large), then reconstruction of the 100 gigabit Ethernet signal becomes more difficult and errors may be generated in this process.

Skew between channels, both multi-wavelength and polarized channels, should be managed to ensure proper operation of the transport system 100. Skew between polarized channels may result from a number of factors relating to both the transmission medium and transport nodes. Polarization modal dispersion (hereinafter, "PMD") may cause differential latency between the channels during transport because of differing propagation velocities of the channels. These differing propagation channel velocities are caused by the interactions of the polarized channels with the fiber. For example, a first channel propagating in a first polarization mode within a piece of fiber may have a slightly different velocity than a second channel propagating in a second polarization mode within the same piece of fiber. This difference in channel velocities results in a skewing of the timing between the channels.

Skew between polarized channels may also result in differences in signal path lengths between the channels. For example, polarized channels may be separated and communicated on different signal paths within a node. One cause of these slight differences in lengths is variations of fiber pigtails lengths that propagate the polarized channels. These different fiber pigtail lengths may also result in skewing between channels. Other components, both optical and electrical, within a transport node may also introduce skew between these polarized channels.

In order for the transport system to function properly, this skew between polarized channels needs to be managed. As the client signal rate increases, the management of the skew may become more complex because of the relatively larger amount of data that is propagated through the transport network. In effect, the transport network must provide the client more bandwidth, which means that either the number of channels serving the client is increased or the channel data rates are increased. In either scenario, maintaining the timing relationship of this client data as it propagates through the transport network becomes more complex.

SUMMARY OF THE INVENTION

Embodiments of the present invention provide systems, devices and methods for managing skew within a polarized multi-channel optical transport system. In a dual polarization QPSK system (hereinafter, "DP-QPSK system"), skew between polarized channels is compensated within the transport system by adding latency to at least one of the polarized channels. The amount of added latency may depend on various factors including the skew tolerance of the transport system and the amount of skew across the channels without compensation. This latency may be added optically or electrically, and at various locations on a channel signal path within a transport node. Additionally, various embodiments of the invention provide for novel methods of inserting frame alignment bit sequences within the transport frame overhead so that alignment and skew compensation may be more efficiently and accurately performed at the transport receiver.

In certain embodiments of the invention, a transport terminal receiver node comprises at least one latency compensation module that adds latency to at least one polarized channel in the transport system. This added latency improves the timing between polarized optical channels so that a client signal may be more efficiently reconstructed. If this latency is added in the optical domain, then a polarized channel optical skew compensation module is inserted within an optical channel signal path of the polarized channel to which latency is being added. If this latency is added in the electrical domain, then a polarized channel electrical skew compensation module is inserted within an electrical signal path of the polarized channel to which skew is being added. One skilled in the art will recognize that these skew compensation modules may be located in numerous different locations within a terminal node, all of which are intended to fall within the scope of the present invention.

In certain embodiments of the invention, pre-skew compensation is provided within a transmitting transport node to reduce skew across polarized channels. This pre-skew compensation may be provided in either the electrical or optical domains at the transmitting node. Skew detection may also be included within the polarized multi-channel transport system to identify skew between polarized channels. This skew detection may be employed during initial configuration of the system, during a re-boot of the system or during operation of the system.

These skew management systems, devices and methods may be realized in a polarized multi-channel single wavelength transport system in which a plurality of polarized channels is transported on a single wavelength. The skew management systems, devices and methods may also be realized in a polarized multi-channel WDM transport system in which a plurality of wavelengths is used.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Embodiments of the present invention provide systems, devices and methods for managing skew within a polarized multi-channel optical transport system. In a DP-QPSK system, skew between polarized channels is compensated within the transport system by adding latency to at least one of the polarized channels. The amount of added latency may depend on various factors including the skew tolerance of the transport system and the amount of skew across the channels without compensation. This latency may be added optically or electrically, and at various locations on a channel signal path within a transport node, such as a terminal transmitter or receiver. Additionally, various embodiments of the invention provide for novel methods of inserting frame alignment bit sequences within the transport frame overhead so that alignment and skew compensation may be more efficiently and accurately performed at the transport receiver.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different electrical or optical components, circuits, devices and systems. The embodiments of the present invention may function in various different types of environments wherein skew management of polarized channels is relevant including, but not limited to DP-QPSK transport systems. Structures and devices shown below in block diagram are illustrative of exemplary embodiments of the invention and are meant to avoid obscuring the invention. Furthermore, connections between components within the FIGS. are not intended to be limited to direct connections. Rather, connections between these components may be modified, reformatted or otherwise changed by intermediary components.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

Figure 1:
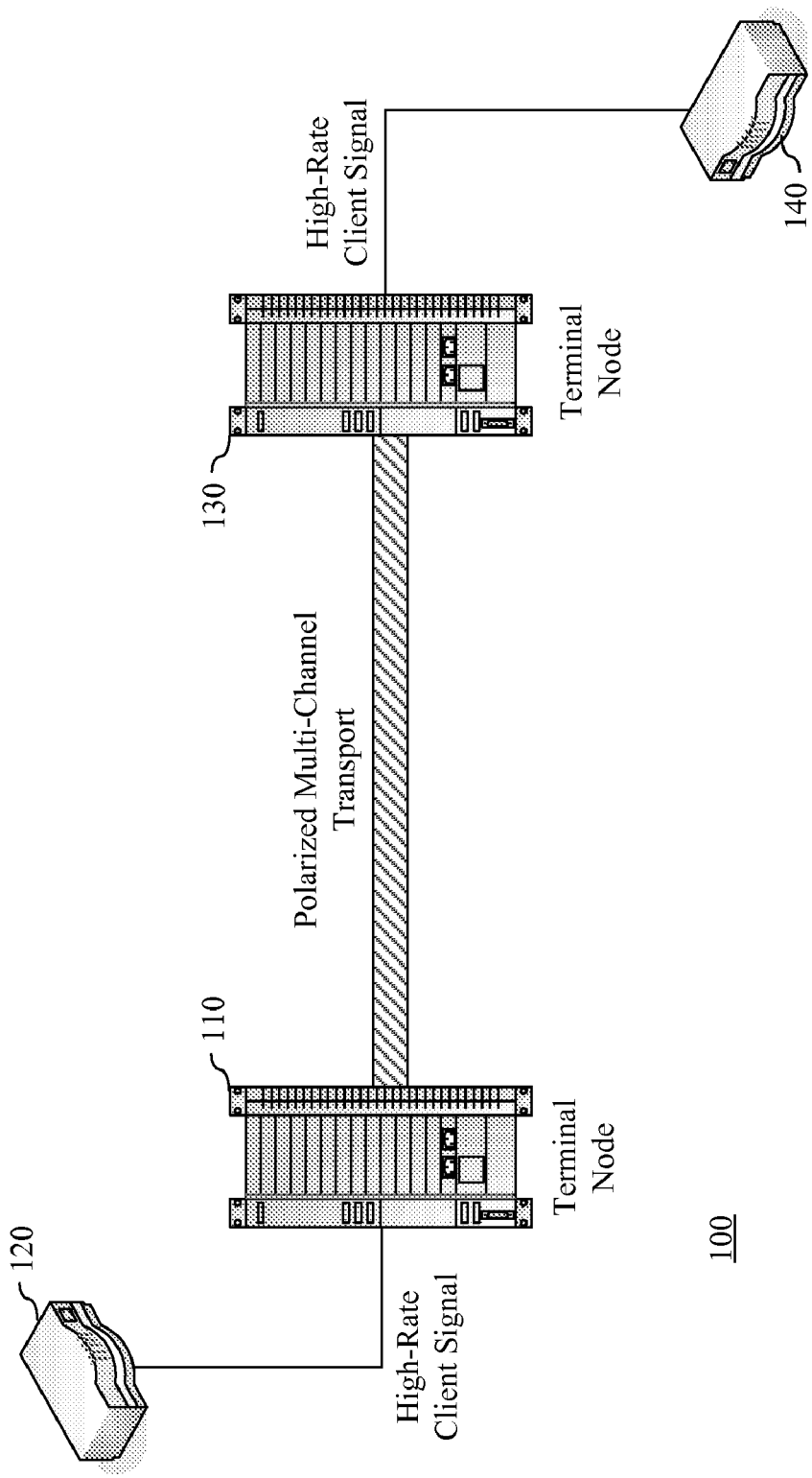
FIG. 1 generally illustrates a polarized multi-channel transport system on which client signals are communicated.
Figure 2A:
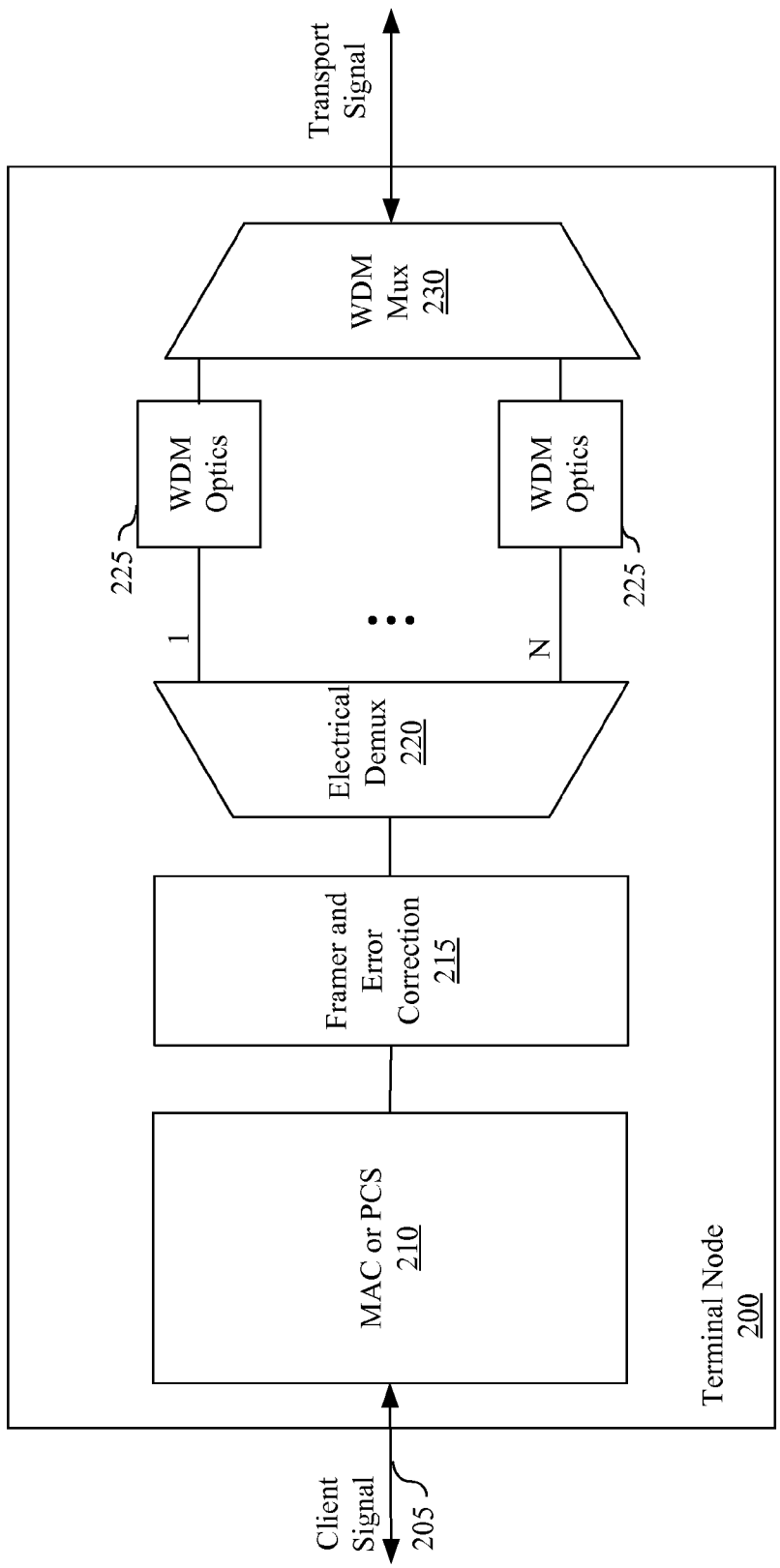
FIG. 2A is a block diagram of an optical transceiver on which multiple channels are transmitted on and received from a WDM system.

FIG. 2A generally illustrates an exemplary transport terminal node that transmits and receives client data on a transport system. One skilled in the art will recognize that other components, not shown in this illustration, may be present within the terminal node. If the terminal node 200 is operating as a transmitter, then the node 200 receives a high-rate client signal 205 on a MAC or PCS 210. A framer and error correction module 215 frames the client data into a transport frame and inserts error correction information, such as forward error correction (hereinafter, "FEC"), into the frame. An electrical demultiplexer 220 divides the framed client data onto N lanes, which effectively define channels on which the client data is to be transported. This demultiplexing process is necessary because the rate of the client signal is higher than the channel rate of the transport system. One skilled in the art will recognize that the present invention may embody any number of demultiplexer lanes and various methods for spreading the client data across these lanes. Furthermore, one skilled in the art will recognize that the number of demultiplexer lanes may not necessarily equal the number of channels in which the client data is transported.

WDM optic modules 225 are provided on each of the N lanes to convert the demulitplexed signals into the optical domain. The WDM optic modules 225 comprise a light source, such as a DFB laser, and a modulator that modulates the light with the client data. A WDM multiplexer 230 combines the modulated optical signals into a single WDM signal and transmits it into optical fiber for propagation within the transport system. Accordingly, the client data is communicated in parallel on multiple optical channels across the transport system to a receiver terminal node.

As previously described, the time required for each optical channel to propagate through the optical fiber and be terminated at the receiver node may vary. This skew across the channels requires that the transport frames in the channels be aligned at the receiver. The frame alignment procedure allows the client signal to be properly sequenced and subsequently reconstructed from the received optical channels.

The framer and error correction module 215 inserts frame alignment bit sequences that have a particular bit pattern that allows a receiver to identify the frame alignment bit sequences and thereafter align the frame. For example, if the transport frame is an OTN frame, then a frame alignment sequence is inserted at the beginning of the ODU overhead. An OTN receiver is able to identify this frame alignment sequence based on its specific bit pattern and associate the beginning of the OTN frame with the beginning of the frame alignment sequence.

A. Frame Alignment

Referring to FIG. 2A, the frame alignment bit sequence is inserted into the transport frame prior to demultiplexing. The demultiplexer 220 divides this sequence across the N lanes, resulting in a shortened alignment bit sequence on each of the optical channels. This shortening of the frame alignment bit sequence adversely affects the accuracy of the alignment procedure at the receiver because a shortened bit sequence is more likely to be randomly generated within a frame and erroneously identified as a potential frame alignment bit sequence. Client data may be lost during the period in which the channels are mis-aligned and the receiver is searching for frame alignment bit sequences.

Figure 2B:
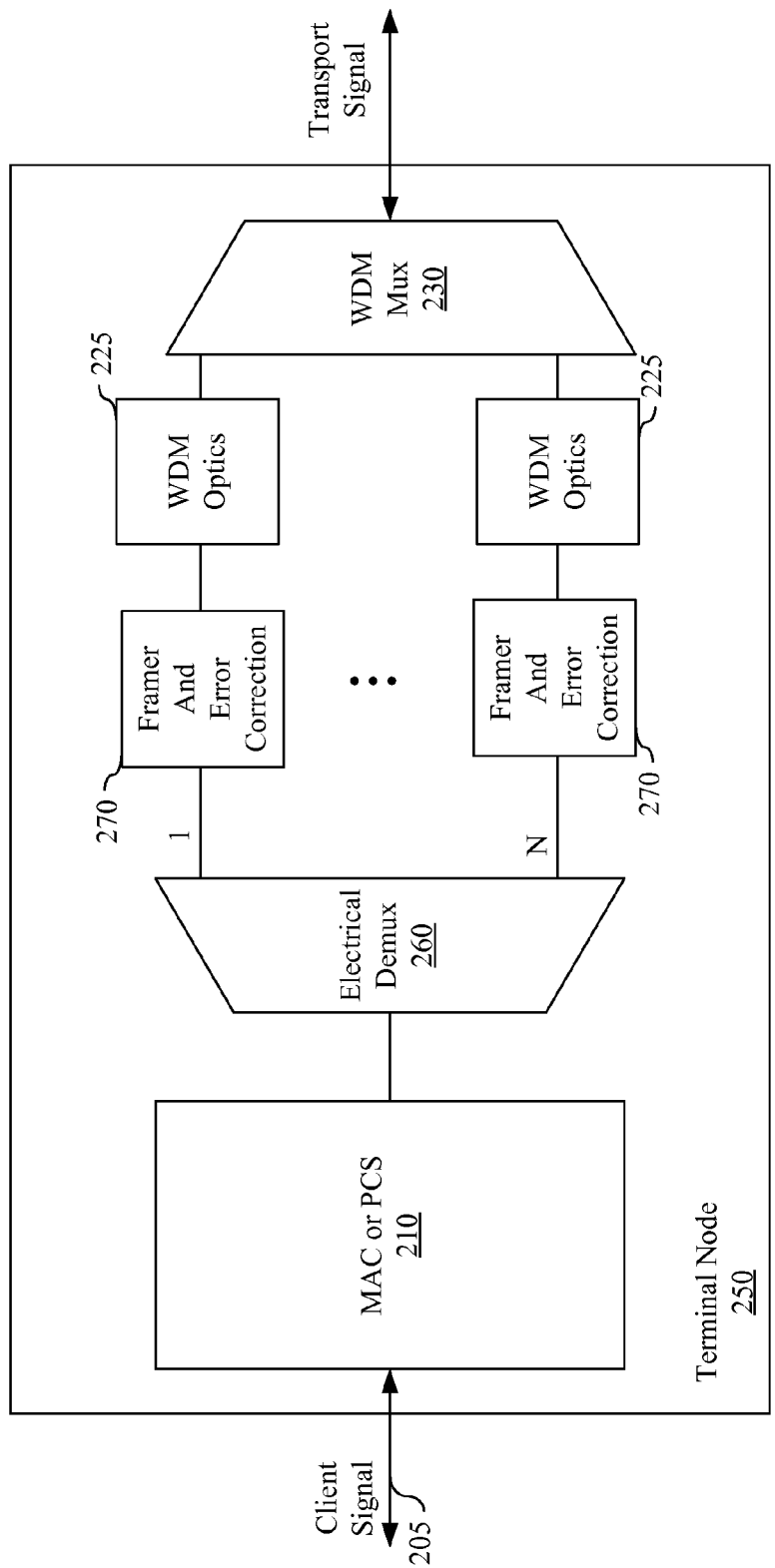
FIG. 2B is another block diagram of an optical transceiver on which multiple channels are transmitted on and received from a WDM system according to various embodiments of the invention.

FIG. 2B illustrates an improved transport terminal node 250 in which the frame alignment bit sequence length is preserved across each of the optical channels. In these embodiments, the client signal is demultiplexed by demultiplexer 260 prior to being framed within the transport frame. The frame alignment bit sequence is inserted into the transport frame by a framer and error correction module 270 specific to a particular optical channel or demultiplexer output lane. Accordingly, framing of the client signal into the transport frame is done in parallel and insertion of frame alignment bit sequences may be performed relative to each optical channel within the transport system. This also allows for a more dynamic insertion of error correction across the optical channels and may also allow an adjustment of the frame alignment bit sequences to one or more of the optical channels.

Figure 3A:
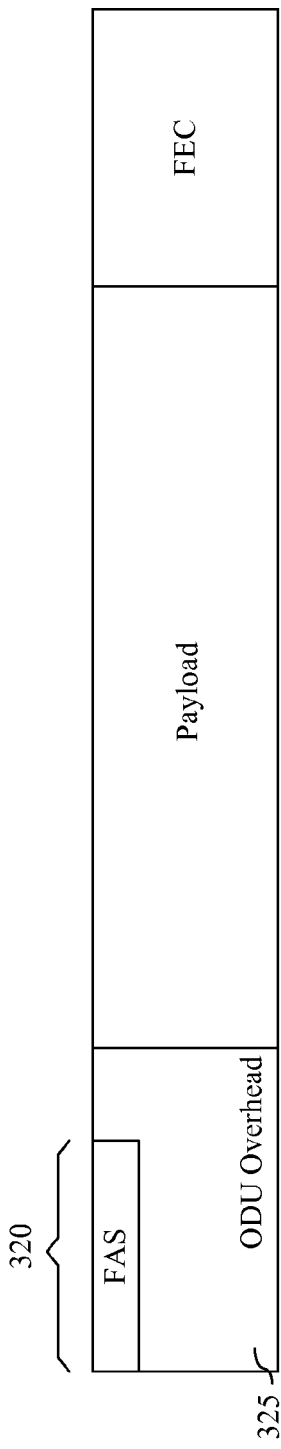
FIG. 3A is an exemplary OTN frame illustrating a frame alignment sequence within ODU overhead.
Figure 3B:
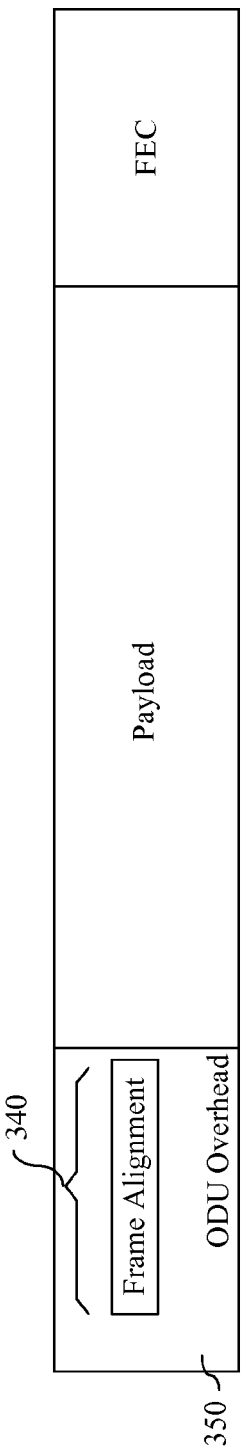
FIG. 3B is an OTN frame illustrating a frame alignment stuff byte pattern within ODU overhead according to various embodiments of the invention.

FIGS. 3A and 3B illustrate examples of an insertion of a frame alignment bit sequence within the overhead of a transport frame 310. FIG. 3A shows a frame alignment sequence ("FAS") 320 inserted at the start of an OTN frame overhead 325. As previously described, a receiver can identify the start of the OTN frame 310 by identifying the specific bit pattern in the FAS. The OTN standard specifically identifies the bit sequence pattern and length, as well as the particular location in the frame overhead.

FIG. 3B shows that the frame alignment bit sequence may be inserted in various locations within the transport frame 330. In this example, the frame alignment bit sequence 340 is inserted deeper within the frame overhead 350. This frame alignment bit sequence 340 can be designed to have different lengths and bit patterns. Additionally, this frame alignment bit sequence 340 may be used by numerous types of transport frames including those defined by public standards and those defined by proprietary protocols.

By inserting these frame alignment bit sequences after a client has been demultiplexed, the sequences can individually inserted into each channel of the transport. The lengths and patterns of the frame alignment bit sequences may be configured on a channel-by-channel basis. Using this alignment information, skew between the channels may be identified and compensated.

The transport frames (e.g., 310, 330) may be used in various types of transport systems. In various embodiments of the invention, frames 310, 330 represent transport sub-frames that are mapped into another transport frame prior to transmission onto a transport connection. For example, frames 310, 330 may be 2.5 gigabit frames that communicate the client signal through a terminal node and are subsequently mapped into a 10 gigabit frame for transmission on the transport network. This mapping procedure may comprise the steps of concatenating or sequentially inserting multiple sub-frames into a single higher rate frame, inserting error correction information such as FEC, and wrapping the multiple sub-frames with a digital wrapper that includes overhead or header information. This alignment information is then used by a receiver node after the 10 gigabit frame has been de-wrapped and the sub-frames extracted therefrom.

In other embodiments, frames 310, 330 are transmitted on the transport network as stand alone frames. For example, frames 310, 330 are 2.5 gigabit frames that communicate the client signal through the terminal node and are then transmitted onto a 2.5 gigabit transport connection. In either event, one skilled in the art will recognize that the frame alignment, skew detection and skew compensation across polarized channels as set forth in the application may be applied to numerous different transport network types and rates.

B. Skew Compensation Across Polarized Channels

Figure 4:
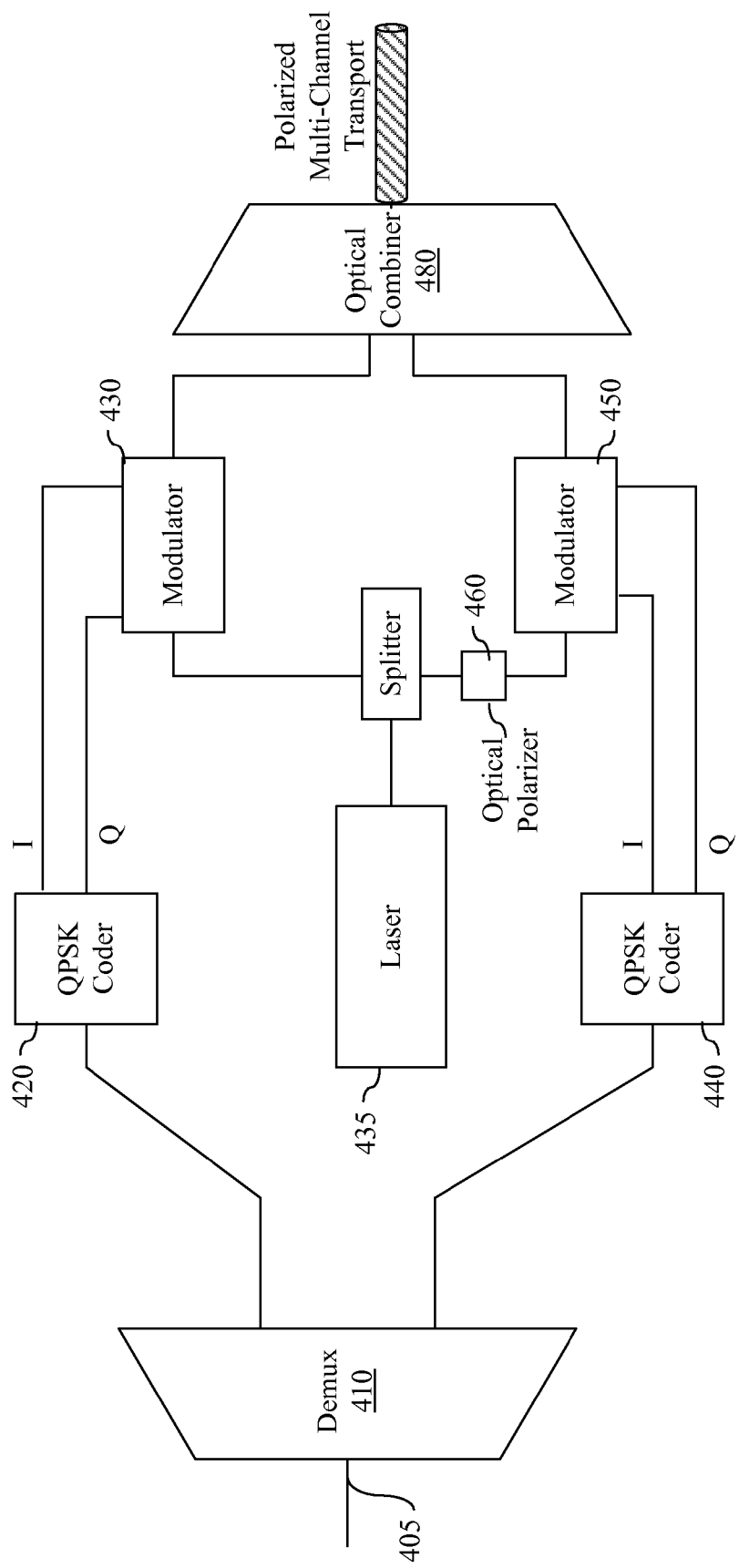
FIG. 4 generally illustrates a DP-QPSK transmitter according to various embodiments of the invention.

FIG. 4 is a general block diagram of a DP-QPSK transmitter, an example of a type of transmitter that generates polarized transport channels according to various embodiments of the present invention. The transmitter 400 generates two polarized optical channels that are communicated on a single wavelength in the transport system. Polarized channels are defined as channels that have a polarity difference or shift relative to each other.

In various embodiments of the invention, a first optical channel is polarized by ninety degrees relative to a second optical channel, both of which are modulated on optical carriers having the same wavelength. Depending on the transport system, these two polarized channels may or may not be multiplexed with other wavelengths prior to transmission into a piece of optical fiber.

A client signal is demultiplexed onto N lanes by demultiplexer 410. In certain embodiments, the client signal is a 100 gigabit Ethernet signal that is demultiplexed onto two lanes, each carrying a 50 gigabit channel. Each of the demultiplexed client signals are input into a quadrature phased shift keying (hereinafter, "QPSK") coder 420. A first QPSK coder 420 generates an "I" channel and a "Q" channel, both of which are input into a first QPSK modulator 430. The QPSK modulator 430 also receives a continuous light signal at a particular wavelength and having a certain polarization from a laser 435.

Based on the input of the "I" and "Q" channels, the modulator 430 outputs a series of QPSK optical symbols. This series of QPSK symbols is within an optical channel and is combined with at least one other optical channel prior to transmission across the polarized multi-channel transport system.

A second QPSK coder 440 generates another set of "I" and "Q" channels from another demultiplexed client signal and transmits these channels to a second QPSK modulator 450. This second QPSK modulator 450 also receives a continuous light signal from the laser 435 and that had its polarity shifted by an optical polarizer 460. In other embodiments, the transmitter 400 uses two lasers to generate the continuous light signals. The second QPSK modulator 450 outputs a second series of optical QPSK symbols having a shifted polarity relative to the first set of QPSK optical symbols, but modulated on the same wavelength. This second series of QPSK optical symbols is within a second optical channel.

An optical combiner 480 combines the two series of QPSK optical symbols into a polarized multi-channel signal. Even though they are modulated on the same wavelength, these two channels do not significantly interfere with each other because of the shifted polarity of one of the channels. The signal is thereafter transported on the polarized multi-channel transport to a receiver that will reconstruct the client signal. The polarized multi-channel signal may also be multiplexed with other optical wavelengths resulting in a WDM signal that is transmitted across the transport system.

As the two channels propagate through the transport system, each channel will interact slightly different with the optical fiber resulting in differential latency between the channels. For example, as previously described, PMD may cause different optical velocities between the two channels based on the two different polarizations of the channels. Additionally, inter-node channel paths may also introduce different latencies between the channels. These different sources of differential latencies results in an overall skew between the channels at the receiver. This skew may be significant enough to adversely affect the reconstruction of the client signal.

Figure 5:
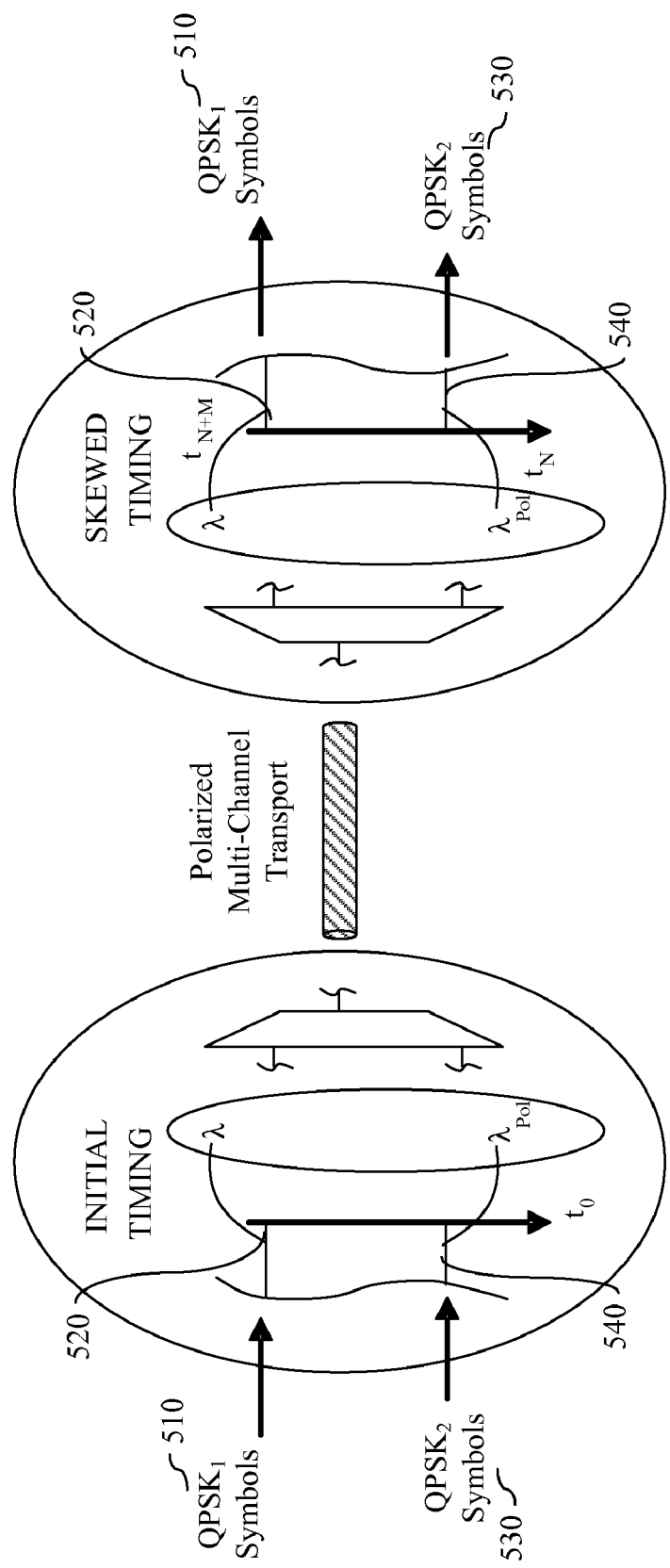
FIG. 5 is a diagram illustrating polarized channel skew across a polarized multi-channel transport according to various embodiments of the invention.

FIG. 5 further illustrates this skewed timing across polarized channels within a transport system according to various embodiments of the invention. A first set of QPSK symbols 510 is used to generate a first optical channel ($\lambda$) 520 and a second set of QPSK symbols 530 is used to generate a second optical channel ($\lambda_{Pol}$) 540. In certain embodiments, the polarity of this second optical channel 540 is shifted ninety-degrees from the first optical channel 520. At an initial point in time ($t_0$), the timing between the channels is accurate (i.e., there is no skew between the channels).

After the channels are combined and transported across the polarized multi-channel transport connection, skew between the two channels is generated. For example, the time required by the polarized second optical channel 540 to propagate through the transport system and be terminated is equal to N. Comparatively, the time required by the first optical channel 520 to propagate through the transport system and be terminated is equal to N+M. The differential latency or skew between the two channels is thus equal to M time units.

If M is sufficiently large, it may adversely affect the reconstruction of the client signal at the transport receiver node. An intentional latency of approximately M may be inserted on the second optical channel 540 to compensate for the additional latency seen on the first optical channel 520. This additional latency on the second optical channel 540 effectively realigns the timing between the two channels.

Figure 6:
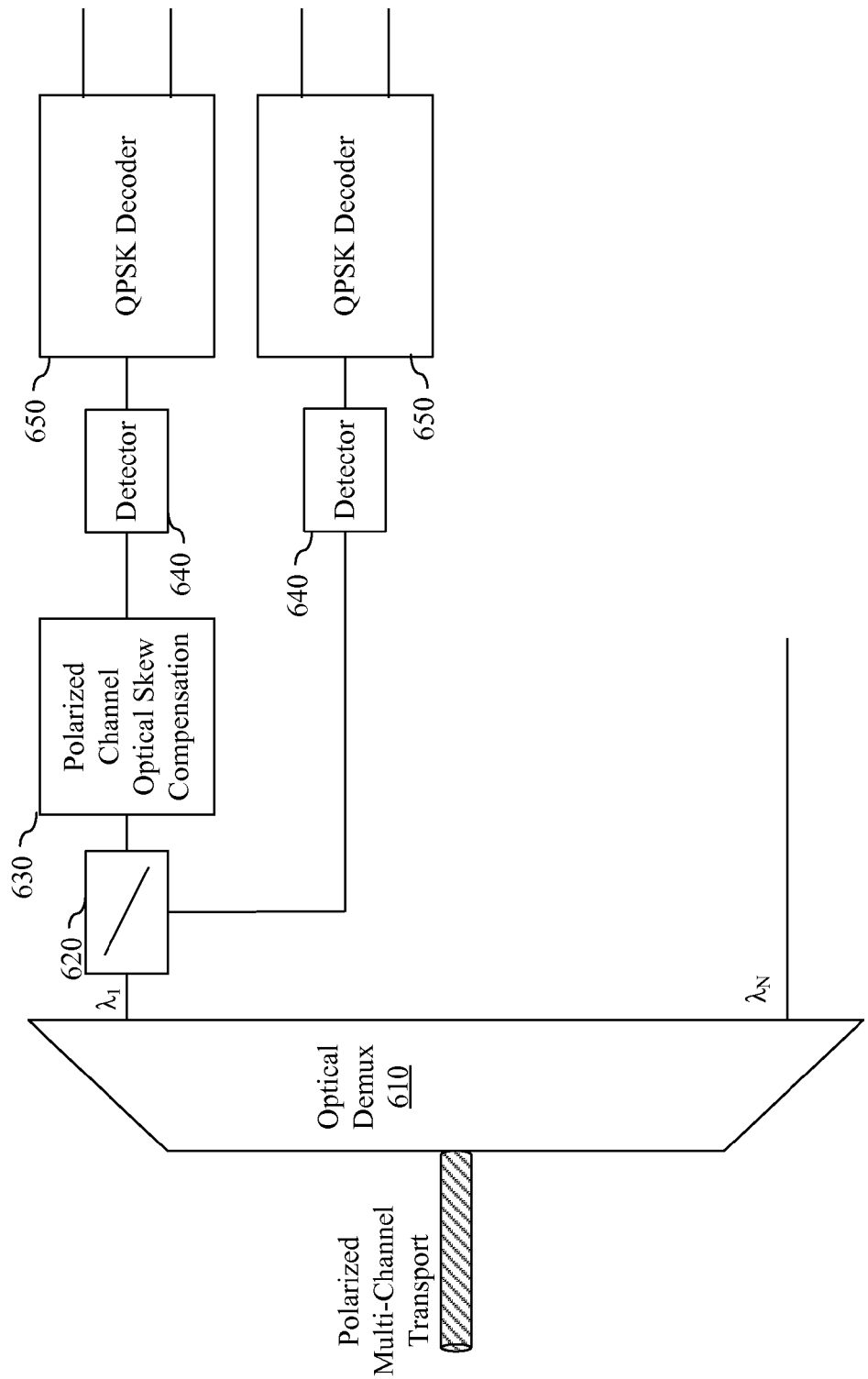
FIG. 6 is a block diagram illustrating optical skew compensation across polarized channels in accordance with various embodiments of the invention.
Figure 7:
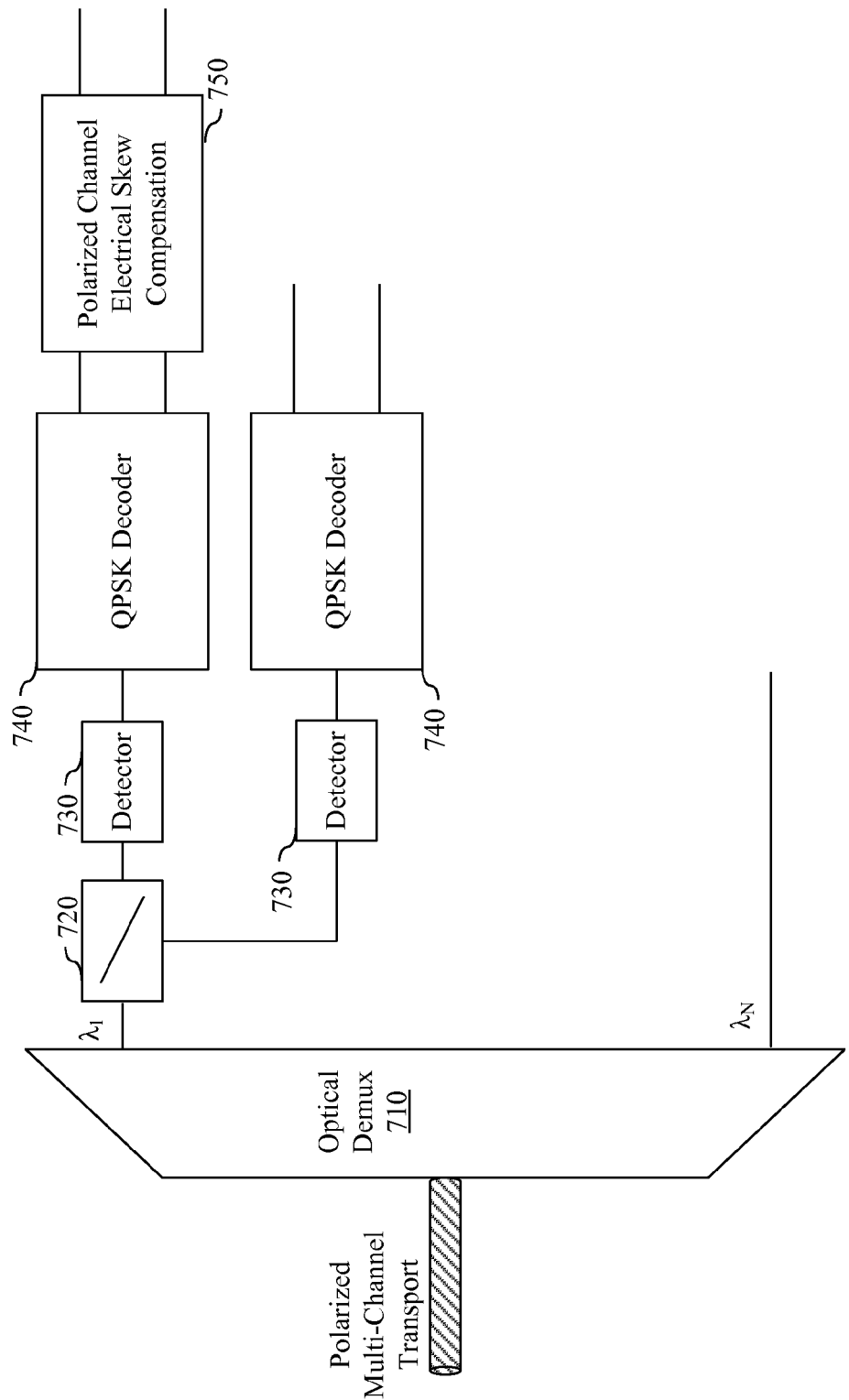
FIG. 7 is a block diagram illustrating electrical skew compensation across polarized channels in accordance with various embodiments of the invention.
Figure 8:
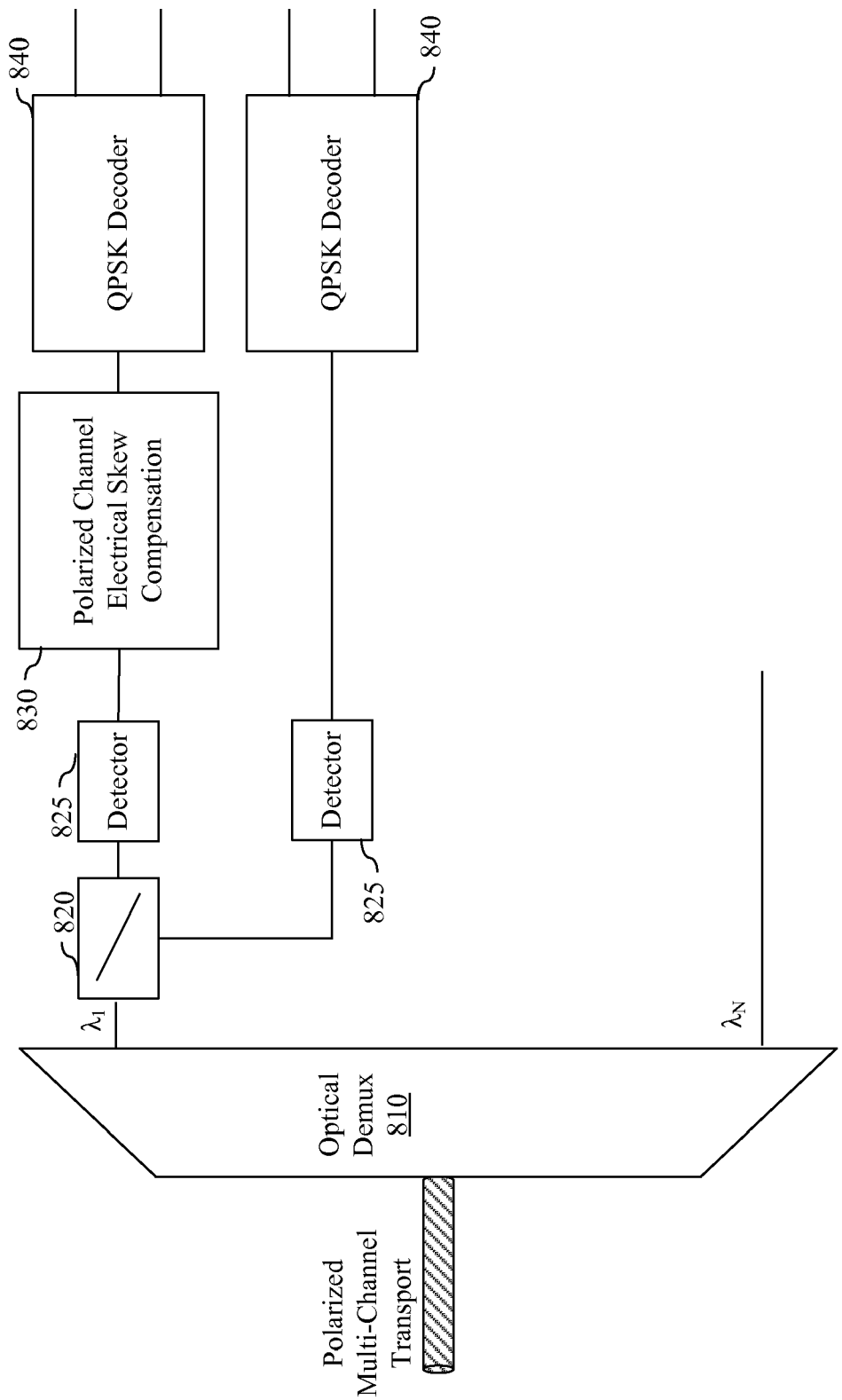
FIG. 8 is another block diagram illustrating electrical skew compensation across polarized channels in accordance with various embodiments of the invention.

FIGS. 6-8 illustrate devices and methods for compensating skew in a polarized multi-channel transport systems according to various embodiments of the invention. Referring to FIG. 6, polarized channel skew compensation is performed within the optical domain at a transport receiver by adding latency on at least one of the channels. A polarized multi-channel WDM signal is received and separated into wavelength components by an optical demultiplexer 610. This results in each of the demultiplexed wavelengths ($\lambda_1$-$\lambda_N$) being transmitted on one of optical lanes 1-N.

A first polarized multi-channel wavelength $\lambda_1$ is separated into two channels by a polarization splitter 620 resulting in two optical channels, one of which having its polarization shifted relative to the other one. As previously discussed, the timing between the two polarized channels may be skewed because of their propagation through the optical fiber and in the receiver node. In order to compensate for this skew, latency is added on one of the channels by a polarized channel optical skew compensation module 630. In various embodiments of the invention, the polarized channel optical skew compensation module 630 is a fiber coil that is designed to introduce a particular latency on one or more of the polarized channels. For example, the length of the fiber coil may be adjusted to provide a specific latency so that the timing of the two channels is corrected.

The two channels are converted into the electrical domain by detectors 640. These detectors 640 may be PIN diodes, avalanche photo-diodes or other optical-electrical converters known to one of skill in the art. Thereafter, the two electrical channels are converted into "I" and "Q" channels by QPSK decoders 650. These "I" and "Q" channels are further processed within the receiver so that the client signal is eventually reconstructed and transmitted to a client network.

One skilled in the art will recognize that the polarized channel optical skew compensation module 630 may be positioned at various locations within the transport receiver node. Furthermore, various types of optical buffers may also be used to realize the polarized channel optical skew compensation module 630. Although FIG. 6 illustrates the transport signal as being a WDM signal, the above-described embodiments may also be applied to a multi-channel transport signal using a single wavelength.

Skew compensation across polarized optical channels may also be performed within the electrical domain. FIG. 7 illustrates a portion of a transport receiver node in which electrical skew compensation is performed on polarized channels according to various embodiments of the invention. A polarized multi-channel WDM signal is received and separated into wavelength components by an optical demultiplexer 710 resulting in the demultiplexed wavelengths ($\lambda_1$-$\lambda_N$) being transmitted on one of optical lanes 1–N.

As previously discussed, the first polarized multi-channel wavelength $\lambda_1$ is separated into two channels by a polarization splitter 720 resulting in two optical channels. Each of the optical channels is converted into electrical signals by detectors 730 (e.g., PIN diode, avalanche photodiode, etc.) resulting in two corresponding electrical streams of QPSK symbols signals. These electrical signals are decoded by QPSK decoders 740 resulting in "I" and "Q" channels for each of the electrical signals.

A polarized channel electrical skew compensation module 750 may be positioned within the path of one or more of the "I" and "Q" sets. This polarized channel electrical skew compensation module 750 introduces latency in each of the "I" and "Q" streams to improve skew across the polarized channels. In certain embodiments of the invention, an electrical buffer, such as a first-in first-out buffer (hereinafter, "FIFO buffer"), is used to add latency to the "I" and "Q" set. This introduced latency is used to reduce the skew across the two polarized channels. This latency may be dynamically modified to compensate for variable skew across the polarized channels. For example, the number of stages within the FIFO buffer may be modified so that the total latency through the buffer is changed.

Other types of electrical devices and/or components may be used to introduce latency into one or more of the channels. For example, an off-chip memory device may be used to introduce relatively large amounts of latency or be used to dynamically allocate latency across multiple channels. In addition, memories in other electrical components, such as an FPGA or ASIC, within the channel's path may also be used to introduce latency to the particular channel. Although FIG. 7 illustrates the transport signal as being a WDM signal, the above-described embodiments may also be applied to a multi-channel transport signal using a single wavelength.

One skilled in the art will recognize that electrical skew compensation for polarized channels may be performed in numerous locations within the transport receiver nodes. FIG. 8 illustrates yet another example electrical skew compensation within a receiver node according to various embodiments of the invention.

In this example, electrical skew compensation is performed on a channel of serial QPSK symbols prior to decoding. Similar to the receiver system shown in FIG. 8, a demultiplexer 810 separates a WDM system into wavelength components and a polarization splitter 820 separates polarized channels on a single wavelength.

The separated polarized channels are converted into the electrical domain by detectors 825, resulting in serial electrical streams of QPSK symbols. Latency is added on one of the channels by a polarized channel optical skew compensation module 830 prior to decoding of the serial stream of QPSK symbols. This skew compensation is performed in the electrical domain and may be realized using various structures including the FIFO buffer and off-chip memory previously discussed.

The skew compensated serial QPSK symbols are decoded by QPSK decoder 840 into "I" and "Q" channels, which are subsequently processed. The skew compensation performed on the serial QPSK symbols should bring the skew between the channels within a tolerable range and allow proper reconstruction of the client signal. Although FIG. 8 illustrates the transport signal as being a WDM signal, the above-described embodiments may also be applied to a multi-channel transport signal using a single wavelength.

Figure 9:
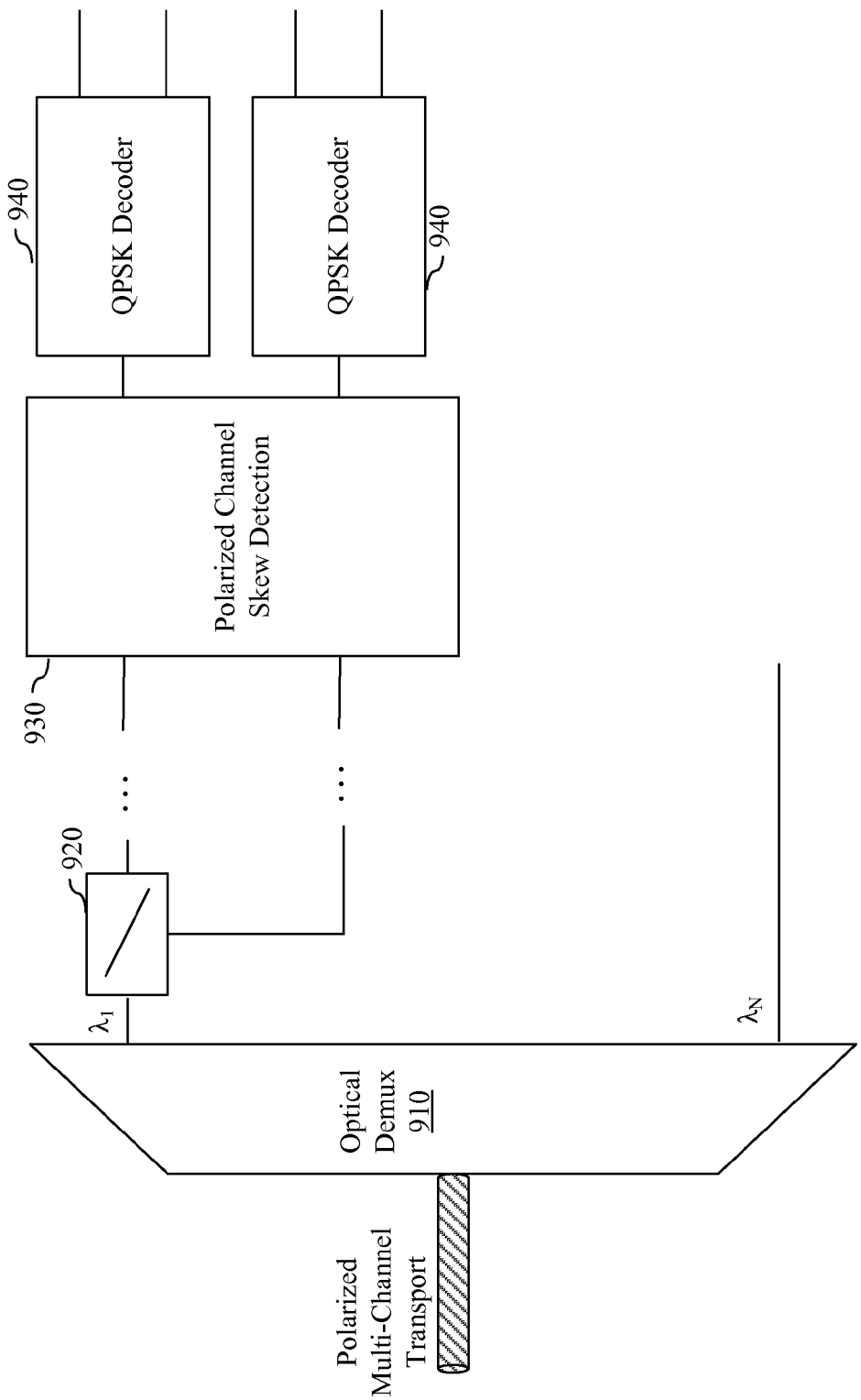
FIG. 9 is a block diagram illustrating skew detection across polarized channels in accordance with various embodiments of the invention.

FIG. 9 illustrates a polarized multi-channel transport receiver node having polarized channel skew detection in accordance with various embodiments of the invention. A polarized multi-channel optical signal is separated into component wavelengths ($\lambda_1$-$\lambda_N$) by optical demultiplexer 910. A first wavelength $\lambda_1$ contain two polarized channels, which are separated using a polarization splitter 920 resulting in two separate channels propagating on two separate lanes.

A polarization channel skew detection module 930 is coupled in the signal paths of the two separate channels so that it can detect the skew between the channels. In certain embodiments, this skew detection is done by aligning the frames on the two separate channels and determining a time difference between the frames. For example, frame alignment bit sequences may be identified in frames on both channels and a timing skew or bit shift between the frames is calculated.

In this figure, the polarization channel skew detection module 930 is positioned prior to QPSK decoders 940 so that skew is calculated on serial streams of electrical QPSK symbols. However, the polarization channel skew detection module 930 may be positioned in other locations within the transport receiver, including after the QPSK decoders 940 so that skew detection is performed on "I" and "Q" channels or other signal generated therefrom.

The polarized channel skew detection module 930 may be used at initial configuration of the transport system so that skew across the two polarized channels can be determined and adjusted. Additionally, the polarized channel skew detection module 930 may also dynamically monitor the skew across the two channels and communicate skew information, including the skew drifting outside of an allowable skew margin. For example, if the skew between the two channels becomes too great, then the polarized channel skew detection module 930 may generate an alarm to a user. The polarized channel skew detection module 930 may also communicate detected skew information back to a transmitting transport node so that pre-skew or other compensation may be performed. This communication may be done in the transport control plane or use other communication techniques known to one of skill in the art.

Figure 10:
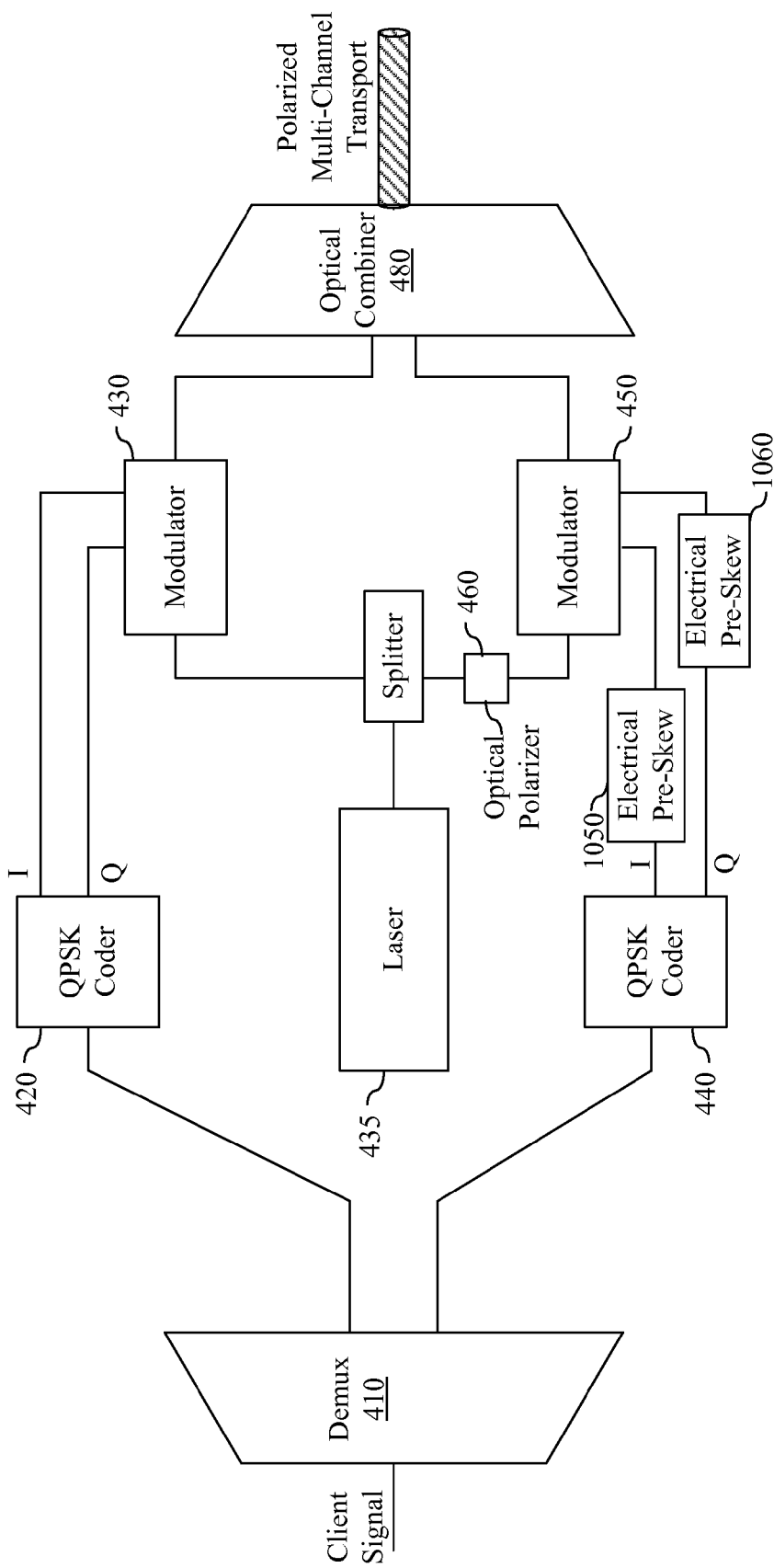
FIG. 10 illustrates electrical pre-skew functionality in a polarized multi-channel transmitter according to various embodiments of the invention.

FIG. 10 illustrates an example of a transport transmitting node in which electrical pre-skew is performed across polarized channels according to various embodiments of the invention. In this example, latency is added on the "I" and "Q" channels corresponding to one of the polarized channels to be transmitted across the transport system. This latency compensates for differential latency experienced by the two polarized channels as they propagate through the transport system.

A first electrical pre-skew module 1050 is positioned on an "I" channel and coupled between the second QPSK coder 440 and the second QPSK modulator 450. A second electrical pre-skew module 1060 is positioned on a "Q" channel and is also coupled between the second QPSK coder 440 and the second QSPK modulator 450. The latency placed on both the "I" and "Q" channels are equal so that QPSK correctly codes the data and generates the appropriate QPSK symbols. These electrical pre-skew modules 1050, 1060 may be comprised of various structures including, but not limited to, FIFO buffers and off-chip larger memories such as caches.

The pre-skewed "I" and "Q" channels are used to generate a pre-skewed serial stream of QPSK symbols. These QPSK symbols are used to modulate a continuous light signal and create an optical channel on a first wavelength. As previously discussed, one of the outputs of the laser splitter 460 is polarized by ninety degrees prior to modulation using the pre-skewed QPSK symbols.

This polarized optical channel is multiplexed with another optical channel having a different polarization but on the same wavelength. In certain embodiments, an optical combiner 480 is integrated within an optical multiplexer to combine the two channels on the same wavelength. These two optical channels may also be multiplexed by the optical multiplexer with other channels and transmitted on the polarized multi-channel transport system. It is important to note that in other embodiments, the polarized multi-channel transport system may exclusively transport the two polarized channels on a single wavelength. One skilled in the art will recognize that pre-skew may be inserted in various locations within the transmitting node of the transport system.

Figure 11:
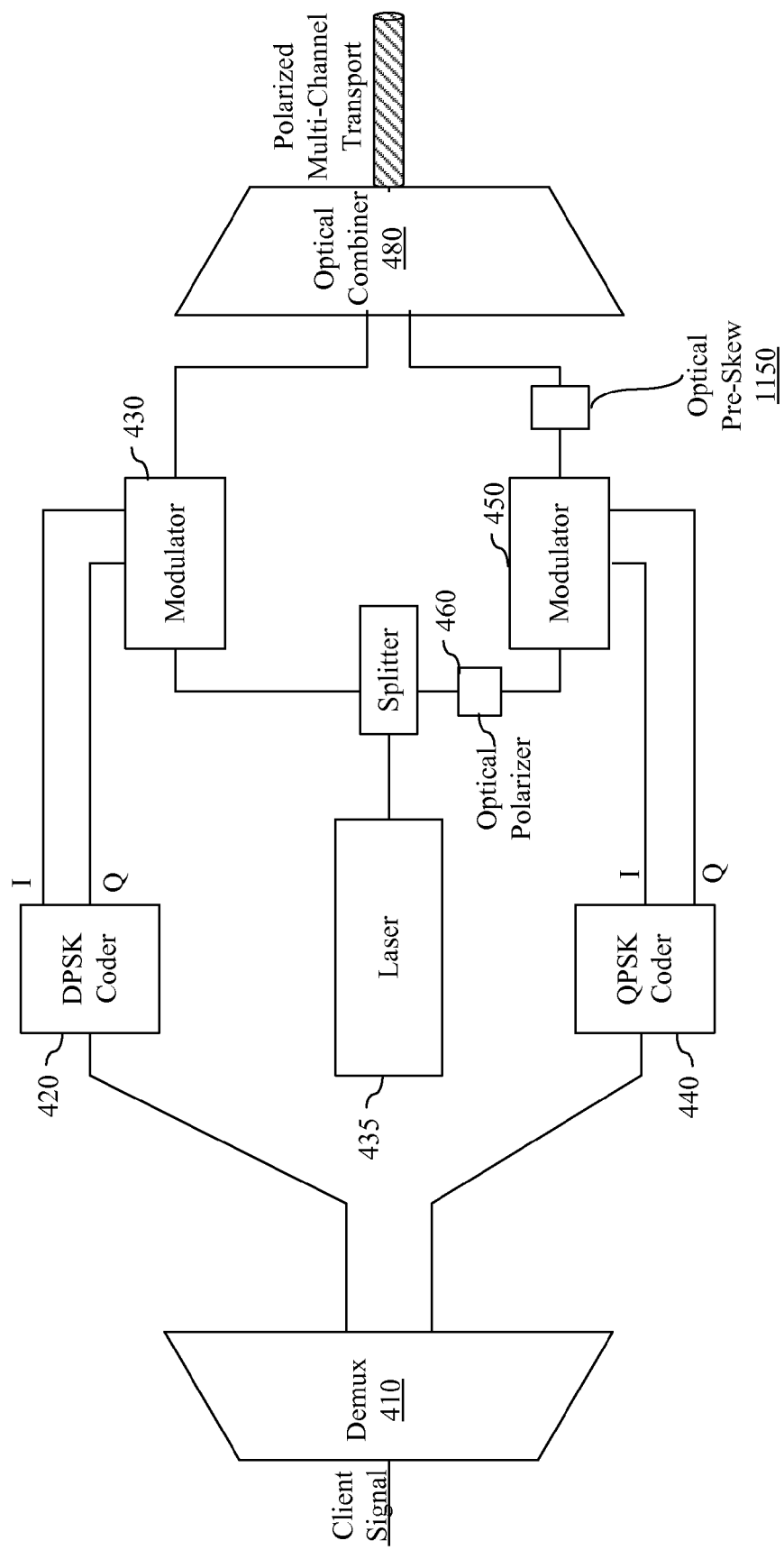
FIG. 11 illustrates optical pre-skew functionality in a polarized multi-channel transmitter according to various embodiments of the invention.

Pre-skew may also be inserted in a channel within the optical domain. FIG. 11 illustrates an example of this optical pre-skew insertion in a polarized optical channel according to various embodiments of the invention.

In this example, an optical pre-skew module 1150 is inserted within the optical signal path between the output of the second QPSK modulator 450 and the optical combiner 480, which may be an optical polarized multi-channel combiner and/or optical wavelength multiplexer. The optical pre-skew module 1150 may comprise a fiber coil that introduces a particular latency within an optical signal.

In various embodiments of the invention, the optical pre-skew module 1150 introduces a particular latency on a polarity-shifted optical channel so that skew across the polarized channels is under a preferred threshold.

The pre-skewed optical QPSK signal may be combined with other channels and transmitted across the transport. These other channels may be on the same wavelength but polarized relative to each other, on multiple wavelengths, or a combination thereof One skilled in the art will recognize that this optical pre-skew module may be located in various locations within the transmitting node, all of which are intended to fall within the scope of the present invention.

C. Method for Managing Skew across Polarized Channels

Figure 12:
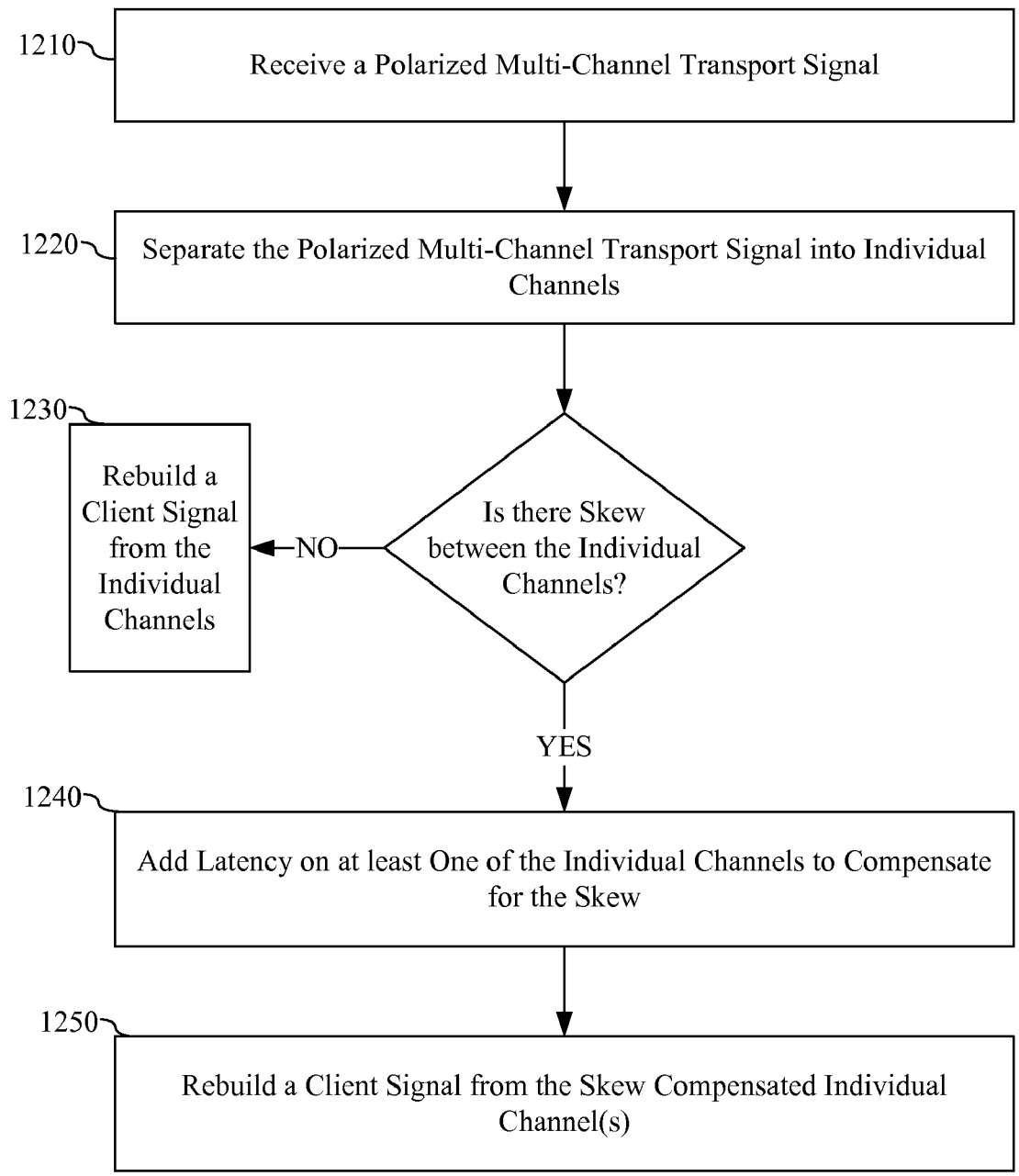
FIG. 12 is a flowchart illustrating a method for reducing skew in a polarized multi-channel system according to various embodiments of the invention.
Figure 13:
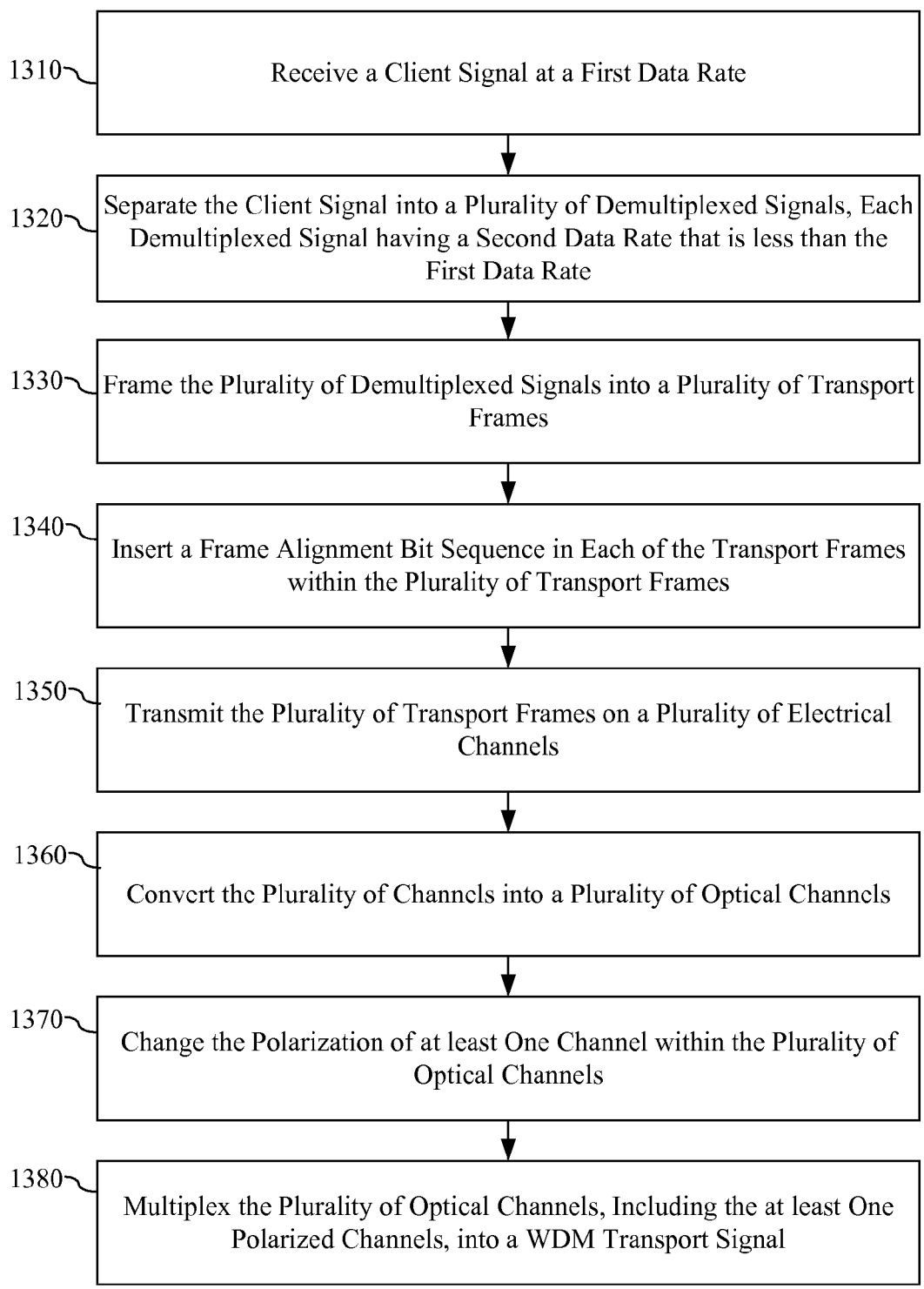
FIG. 13 is a flowchart illustrating a method for inserting a frame alignment bit sequence within a frame of a polarized multi-channel transmitter according to various embodiments of the invention.

FIGS. 12 and 13 illustrate methods, independent of structure, for managing skew within a polarized multi-channel transport system according to various embodiments of the invention. Specific embodiments of the invention have been described above in relation to certain structural components; however, one skilled in the art will recognize that the methods described below may be performed by any structure.

FIG. 12 is a flowchart describing a method for compensating skew across polarized channels according to various embodiments of the invention. A polarized multi-channel transport signal is received 1210 at a network node. As previously described, the polarized multi-channel transport signal comprises at least two channels optically communicated on a single wavelength and having a polarity shift between the channels. For example, first and second optical channels may have a polarity shift of ninety-degrees relative to each other, which allows the channels to be communicated on a single optical wavelength.

The polarized multi-channel transport signal is separated 1220 into individual channels. In certain embodiments, this separation comprises separating the polarity-shifted channels. The transport signal may also comprise other wavelengths which may require wavelengths to be demultiplexed from the transport signal.

An analysis of the skew across the polarized channels is performed to determine whether compensation should be performed. This analysis may be performed at configuration of the system, at a reconfiguration of the system or during the operation of the system. The analysis provides information regarding the amount of skew between the polarized channels that is caused from the transport signal propagating through the system. If the amount of skew is within a tolerable range, then there is no skew compensation performed and a client signal is reconstructed 1230 from the polarized channels.

If the amount of skew is too large, then skew compensation is performed at the node. This skew compensation adds latency 1240 to at least one of the polarized channels to improve the alignment of information across the polarized channels. This skew compensation may be performed in the optical domain or the electrical domain. The amount of latency added may be static or dynamically changed in response to skew changes, such as skew drift, between the polarized channels.

Once the skew compensation has been performed, a client signal is reconstructed 1250 from information within the polarized channels. In certain embodiments, this client data is contained within two polarity-shifted optical channels that propagated on a single wavelength through at least one link on the transport system. In other embodiments, the client data is contained within two polarity-shifted optical channels on a single wavelength and at least one other channel on a different wavelength. After the client signal is reconstructed, it is delivered to an appropriate client network or node.

An important process in the reconstruction of the client signal is properly aligning the polarized channels. FIG. 13 illustrates a method for embedding alignment information within a transport frame according to various embodiments of the invention.

A client signal is received 1310 at a transport node and the rate of the client signal is larger than the base channel rate of the transport system. This data rate difference between the client signal and the transport system results in spreading the client signal across multiple channels for propagation through the transport system. The client signal is separated 1320 into a plurality of demultiplexed signals or channels, each having an effective data rate that is less than the data rate of the client signal prior to being demultiplexed.

Each of the demultiplexed signals is framed 1330 into transport frames. The format of these frames may be defined by a standard(s), such as OTN frames, or may be structured in accordance with a proprietary protocol(s). This framing procedure includes the insertion 1340 of a frame alignment bit sequence in each of the transport frames. This frame alignment bit sequence may vary in size and/or location within the frame. Typically, the frame alignment bit sequence is located within the frame overhead and is sufficiently long to minimize the number of erroneous frame alignment detections at a receiver node.

The transport frames are communicated internally within a transport node on a plurality of electrical channels 1350, which relate to the demultiplexed signals. These electrical channels may have a 1:1 relationship with the demultiplexed signals or result in a different relationship caused by subsequent processing of the demultiplexed signals. These electrical channels are converted 1360 to a plurality of optical channels.

In certain embodiments of the invention, one or more of the optical channel's polarization is shifted 1370 so that it can share an optical wavelength with another channel. For example, one of the channel polarities is shifted by ninety degrees which would allow it to share a wavelength with another channel whose polarity was not shifted.

The plurality of optical channels, including the at least one polarity-shifted channel, are combined 1380 into a multi-channel signal. This multi-channel signal is transmitted on the transport system and eventually received at another node in the system. Using data on the plurality of optical channels and the frame alignment bit sequences in each of the frames, the client signal is aligned and reconstructed at the receiver node. Thereafter, the client signal is delivered to a client network or node.

The foregoing description of the invention has been described for purposes of clarity and understanding. It is not intended to limit the invention to the precise form disclosed. Various modifications may be possible within the scope and equivalence of the appended claims.

I claim:

1. A system for managing skew in a transport connection, the system comprising:
    a transmitting node, coupled to receive a client signal, that maps the client signal into a plurality of polarized channels and transmits the plurality of polarized channels onto the transport connection, each of the plurality of polarized channels including a plurality of frames, each of the plurality of frames including a header, the header including alignment information;
    a receiving node, coupled to receive the plurality of polarized channels, comprising: a polarization splitter, coupled to receive the plurality of polarized channels, that separates the plurality of polarized channels into a first channel and a second channel;
    a skew compensation module, coupled to receive the first channel, that reduces skew between the first and second channels by adding latency to the first channel based on the frame alignment information; and
    a client signal reconstruction module, coupled to receive the skew compensated first and second channels, that reconstructs the client signal from the skew compensated first and second channels
    wherein the skew compensation module adds latency to the first channel within an optical domain.

2. The system of claim 1 wherein the transport connection is a DP-QPSK transport connection.

3. The system of claim 2 wherein the transmitting node further comprises:
    a first QPSK coder that generates a first set of "I" and "Q" channels in response to a first demultiplexed client signal;
    a first QPSK modulator, coupled to receive the first set of "I" and "Q" channels, that generates a first optical QPSK signal;
    a second QPSK coder that generates a second set of "I" and "Q" channels in response to a second demultiplexed client signal;
    a second QPSK modulator, coupled to receive the second set of "I" and "Q" channels, that generates a second optical QPSK signal; and
    wherein a polarization of the second optical QPSK signal is rotated relative to the first optical QPSK signal.

4. The system of claim 3 further comprising an optical combiner, coupled to receive the first and second optical QPSK signals, that combines the first and second optical QPSK signals into a multi-channel transport signal having a single wavelength.

5. The system of claim 3 wherein the polarization of the second optical QPSK signal is rotated by ninety degrees relative to the first optical QPSK signal.

6. The system of claim 1 wherein the skew compensation module adds latency on a first series of QPSK symbols carried by the first channel.

7. The system of claim 1 wherein the skew compensation module adds latency on a first set of "I" and "Q" channels generated from a first series of QPSK symbols carried by the first channel.

8. A receiver node within a transport system, the receiver node comprising:
    an interface that receives a plurality of polarized optical channels each of the plurality of polarized optical channels including a plurality of frames, each of the plurality of frames including a header, the header including alignment information;
    a polarization splitter, coupled to receive the plurality of polarized optical channels, that separates the plurality of polarized optical channels into a first channel and a second channel; and
    a polarized channel skew compensation module, coupled to receive the first channel, that adds latency to the first channel, based on the frame alignment information, to bring skew between the first and second channel below a threshold;
    a first detector that converts the first channel into a first electrical signal; and
    a second detector that converts the second channel into second electrical signal,
    wherein the polarized channel skew compensation module is coupled between the polarization splitter and the first detector and adds latency to the first channel within an optical domain.

9. The receiver node of claim 8 further comprising:
    an optical demultiplexer, coupled to the interface, that separates a WDM signal, comprising the plurality of polarized optical channels, into component wavelength channels; and
    wherein the plurality of polarized optical channels are on a single wavelength.

10. The receiver node of claim 8 wherein the polarized channel skew compensation module comprises a fiber coil.

11. The receiver node of claim 8 further comprising:
a first detector that converts the first channel into a first electrical signal;
a second detector that converts the second channel into a second electrical signal; and
wherein the polarized channel skew compensation module is coupled to receive the first electrical signal and adds latency in an electrical domain, the latency being associated with the first electrical signal.

12. The receiver node of claim 11 wherein the polarized channel skew compensation module is a FIFO buffer.

13. The receiver node of claim 11 wherein the polarized channel skew compensation module is a cache memory.

14. The receiver node of claim 8 wherein the transport system is a DP-QPSK transport system.

15. A method for managing skew across polarized optical channels, the method comprising:
transmitting a polarized multi-channel transport signal including as a plurality of frames, each of the plurality of frames having a header, the header including alignment information;
receiving the polarized multi-channel transport signal;
separating the polarized multi-channel transport signal into a plurality of individual channels;
adding latency to at least one channel within the plurality of individual channels to reduce skew across the polarized optical channels based on the frame alignment information; and
reconstructing a client signal using data that was transported in the polarized optical channels,
wherein the latency that is added to the at least one channel is performed in the optical domain.

16. The method of claim 15 further comprising the step of detecting an amount of skew between a first polarized optical channel of the polarized multi-channel transport signal and a second polarized optical channel of the polarized multi-channel transport signal and adding latency to the first polarized optical channel to reduce the amount of skew.

17. The method of claim 15 wherein the polarized multi-channel transport optical signal is a WDM signal.

18. The method of claim 17 wherein the polarization of the first polarized optical channel is rotated by ninety degrees relative to the polarized second optical channel.

* * * * *